Nov. 12, 1968 R. N. WATTS 3,411,135

ERROR CONTROL DECODING SYSTEM

Filed March 15, 1965 3 Sheets-Sheet 1

INVENTOR
R. N. WATTS
BY Lucian C. Canepa
ATTORNEY

| SHIFT NO. | CONTENTS OF SYNDROME GENERATOR 225 |
|---|---|
| 1 | 1 0 0 0 0 1 1 0 0 1 |
| 2 | 1 0 0 0 1 0 1 0 1 1 |
| 3 | 1 0 0 1 0 0 1 1 1 1 |
| 4 | 1 0 1 0 0 0 0 1 1 1 |
| 5 | 1 1 0 0 0 1 0 1 1 1 |
| 6 | 0 0 0 0 1 1 0 1 1 1 |
| 7 | 0 0 0 1 1 0 1 1 1 0 |
| 8 | 0 0 1 1 0 1 1 1 0 0 |
| 9 | 0 1 1 0 1 1 1 0 0 0 |
| 10 | 1 1 0 1 1 1 0 0 0 0 |
| 11 | 0 0 1 1 1 1 1 0 0 1 |
| 12 | 0 1 1 1 1 1 0 0 1 0 |
| 13 | 1 1 1 1 1 0 0 1 0 0 |
| 14 | 0 1 1 1 0 1 0 0 0 1 |
| 15 | 1 1 1 0 1 0 0 0 1 0 |
| 16 | 0 1 0 1 0 1 1 1 0 1 |
| 17 | 1 0 1 0 1 1 1 0 1 0 |
| 18 | 1 1 0 1 1 0 1 1 0 1 |
| 19 | 0 0 1 1 0 0 0 0 1 1 |
| 20 | 0 1 1 0 0 0 0 1 1 0 |
| 21 | 1 1 0 0 0 0 1 1 0 0 |

ERROR CONTROL DECODING SYSTEM

Filed March 15, 1965

3 Sheets-Sheet 3

| SHIFT NO. | CONTENTS OF SYNDROME GENERATOR 235 |
|---|---|
| 1 | 1 0 0 0 0 0 0 0 0 0 |
| 2 | 0 1 0 0 0 0 0 0 0 0 |
| 3 | 0 0 1 0 0 0 0 0 0 0 |
| 4 | 0 0 0 1 0 0 0 0 0 0 |
| 5 | 0 0 0 0 1 0 0 0 0 0 |
| 6 | 0 0 0 0 0 1 0 0 0 0 |
| 7 | 0 0 0 0 0 0 1 0 0 0 |
| 8 | 0 0 0 0 0 0 0 1 0 0 |
| 9 | 0 0 0 0 0 0 0 0 1 0 |
| 10 | 0 0 0 0 0 0 0 0 0 1 |
| 11 | 1 1 0 0 0 0 1 1 0 0 |
| 12 | 0 1 1 0 0 0 0 1 1 0 |
| 13 | 0 0 1 1 0 0 0 0 1 1 |
| 14 | 1 1 0 1 1 0 1 1 0 1 |
| 15 | 1 0 1 0 1 1 1 0 1 0 |
| 16 | 0 1 0 1 0 1 1 1 0 1 |
| 17 | 1 1 1 0 1 0 0 0 1 0 |
| 18 | 0 1 1 1 0 1 0 0 0 1 |
| 19 | 1 1 1 1 1 0 0 1 0 0 |
| 20 | 0 1 1 1 1 1 0 0 1 0 |
| 21 | 0 0 1 1 1 1 1 0 0 1 |
| 22 | 1 1 0 1 1 1 0 0 0 0 |
| 23 | 0 1 1 0 1 1 1 0 0 0 |
| 24 | 0 0 1 1 0 1 1 1 0 0 |
| 25 | 0 0 0 1 1 0 1 1 1 0 |
| 26 | 0 0 0 0 1 1 0 1 1 1 |
| 27 | 1 1 0 0 0 1 0 1 1 1 |
| 28 | 1 0 1 0 0 0 0 1 1 1 |
| 29 | 1 0 0 1 0 0 1 1 1 1 |
| 30 | 1 0 0 0 1 0 1 0 1 1 |
| 31 | 1 0 0 0 0 1 1 0 0 1 |

United States Patent Office 3,411,135
Patented Nov. 12, 1968

3,411,135

ERROR CONTROL DECODING SYSTEM

Robert N. Watts, Westfield, N.J., assignor to Bell Telephone Laboratories, Incorporated, New York, N.Y., a corporation of New York Filed Mar. 15, 1965, Ser. No. 439,650
6 Claims. (Cl. 340—146.1)

ABSTRACT OF THE DISCLOSURE

A decoder for automatically detecting and correcting certain types of erroneously-received digital data sequences that have been encoded in accordance with a cyclic or pseudo-cyclic code includes two syndrome units. These units generate in a predetermined sequential order a set of binary indications representative of all those single- and double-error patterns that include at least one erroneous information digit. Two counters, a comparator and associated circuitry function in combination with the syndrome units to locate and correct erroneous information digits in a received sequence or to provide an indication that the received sequence contains detected but uncorrectable errors.

This invention relates to digital information processing systems and more particularly to the automatic correction and/or detection of errors in such systems.

The problem of correctly transmitting digital signals along a noisy channel is a significant one whose solution has been actively sought. Some illustrative situations in which this problem arises are: when telephone lines subject to error impulses are being used to transmit data in digital form; when an imperfect medium such as magnetic tape or a photographic emulsion is used to store digital data; or when operations on digital signals are being carried out by means of circuits constructed of devices such as relays, diodes or transistors which have a probability of error.

By using techniques of redundancy it is possible to encode binary information signals to be transmitted in such a way that a decoder is able to extract the original information content therefrom with a high degree of reliability despite the fact that the information signals may have been mutilated to some limited extent during transmission. For more extensive types of mutilation the decoder may not be capable of automatically correcting the information portion of the received signals. However, in cases of more extensive mutilation the decoder may at least be able to detect that the information portion of the received signals is in error. In turn, information signals detected to be in error may be suitably tagged or designated as being erroneous before being delivered to an associated utilization circuit. Also, circuitry may be provided which responds to the detection of erroneous information signals to signal the transmitting equipment of the system to retransmit the erroneously-received and uncorrected sequence.

An object of the present invention is the improvement of digital information-processing systems.

More specifically, an object of this invention is a digital information-processing system having error-correcting and detecting capabilities.

Another object of the present invention is an error control system whose over-all organization is characterized by simplicity of design.

These and other objects of the present invention are realized in a specific illustrative embodiment thereof which comprises a novel decoder to which encoded information sequences of a cyclic or pseudo-cyclic code are applied via a noisy or error-prone communication channel. The information sequences are encoded to contain sufficient redundancy to permit them to be slightly mutilated during their propagation along the noisy channel and still be correctly interpreted by the decoder.

Each encoded information sequence received by an illustrative decoder made in accordance with the principles of the present invention includes $n$ digits, the first $k$ of which are information digits and the remainder of which are check digits. The check digits are derived from the information digits in accordance with a predetermined parity relationship which makes it possible for the decoder to automatically correct all those single- and double-error patterns that include at least one erroneous information digit. For other error patterns the decoder may be able to detect the occurrence thereof.

Briefly, an illustrative decoder embodying the principles of this invention includes circuitry responsive to the information digit portion of a received redundant sequence for recalculating a set of check digits in accordance with exactly the same parity relationships by which encoding circuitry at the transmitting terminal had generated the $n$-$k$ check digits of a transmitted sequence. The check digits recalculated in the decoder are then compared with the check digits included in the received sequence. The modulo 2 sum of these two sets of check digits is an $n$-$k$ digit error syndrome word which is stored in an error syndrome register. If the number of "1's" in this word is 2 or less, the received information digits are thereby indicated to be correct and are therefore delivered to an associated utilization circuit without further processing. If the number of "1's" in the noted word is greater than 2, an attempt is made by the decoder to locate the error or errors in the information digit portion of the received sequence.

The attempt by the decoder to locate errors in a received redundant word involves the sequential generation by two syndrome shift register units of selected ones of the error location patterns which are characteristic of single and double-error occurrences in the received sequence. These generated patterns or words are sequentially compared with the stored error syndrome word. If a match of these words occurs, the search ends. The actual location in the received word of the erroneous information digit or digits is indicated by circuitry that counts the number of times the syndrome units had to be shifted to achieve the match condition. Correction is then carried out simply by inverting the erroneous digit or digit thus located. If no match occurs, the detector provides a signal indicative of the detection of an uncorrected error pattern.

It is a feature of the present invention that an error control decoder comprise circuitry for sequentially generating the error location patterns which correspond to all single- and double-error occurrences that include at least one erroneous information digit.

It is a further feature of this invention that the decoder include circuitry for sequentially comparing the generated patterns with a syndrome pattern representative of the error status of a received word.

It is a still further feature of the invention that the decoder include circuitry responsive to a match between the syndrome pattern and one of the generated patterns for locating the information digit position or positions actually in error.

A complete understanding of the present invention and of the above and other objects, features and advantages thereof may be gained from a consideration of the following detailed description of a specific illustrative embodiment thereof presented hereinbelow in connection with the accompanying drawings, in which.

Figure 1:
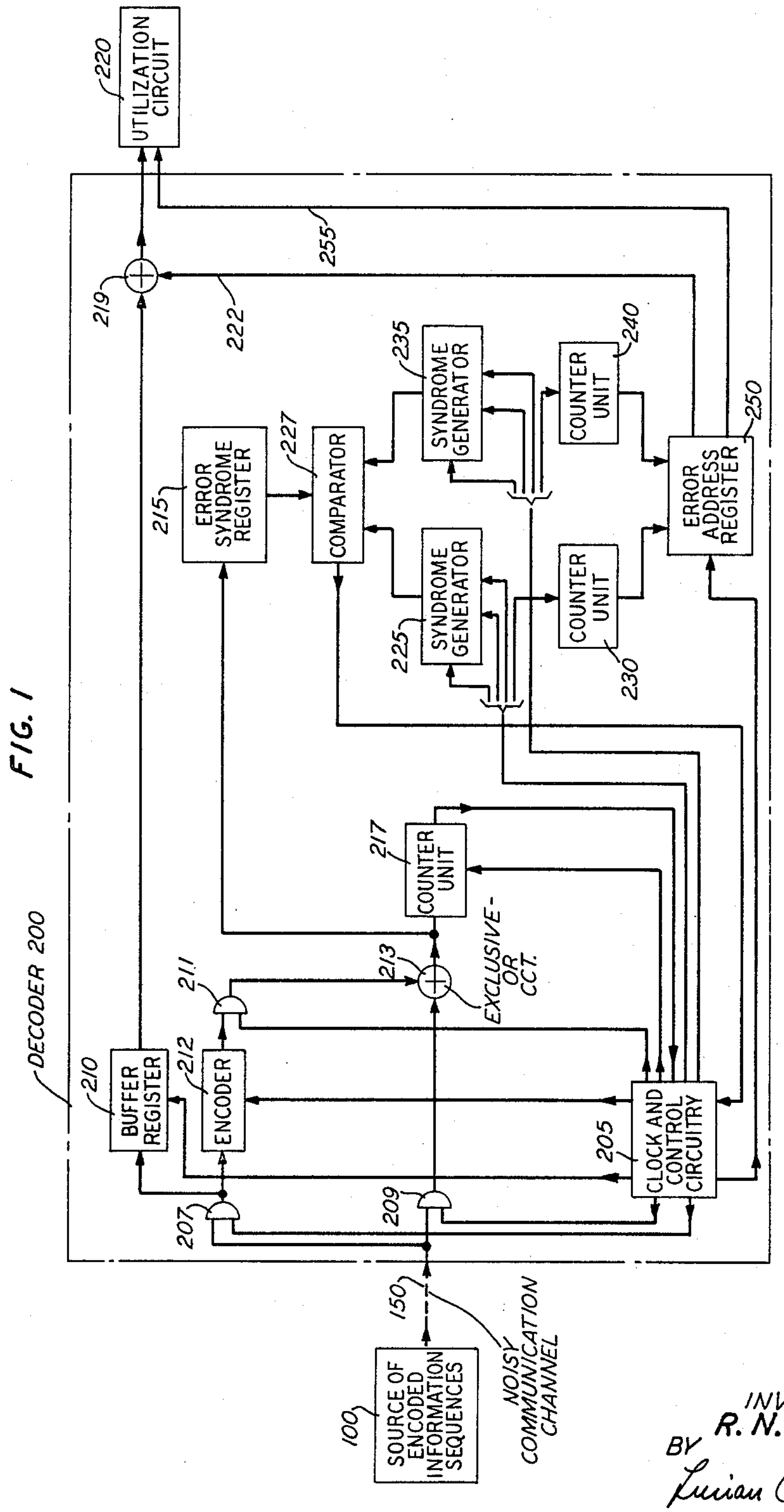
FIG. 1 depicts an information-processing system which includes a specific illustrative decoder made in accordance with the principles of the present invention.
Figures 2A, 2B:
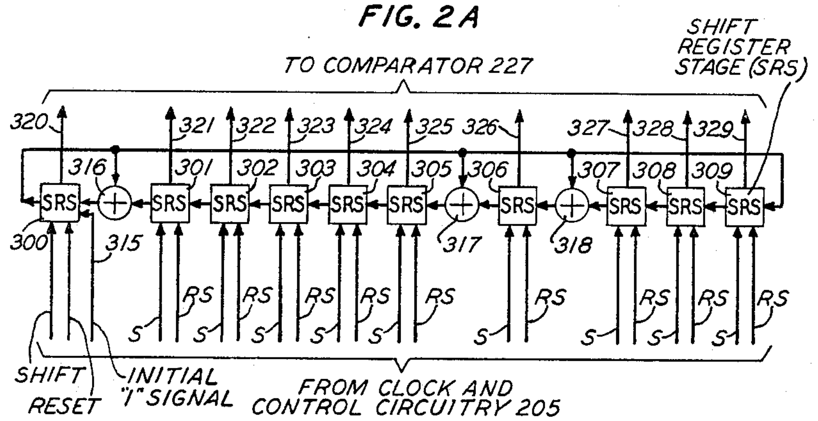
FIG. 2A shows the configuration of a syndrome generator 225 included in the novel decoder of FIG. 1.
Figures 3A, 3B:
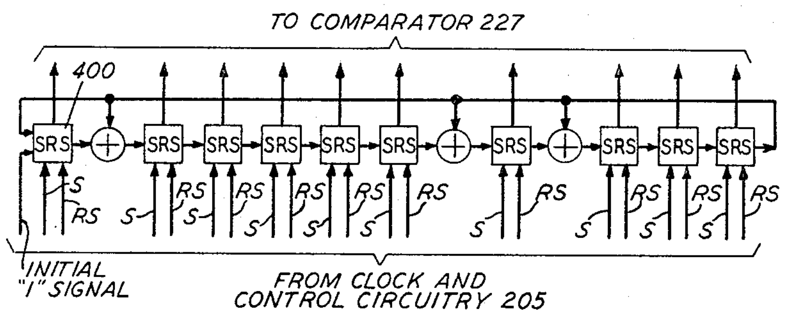

FIG. 2B lists the binary representations generated by the unit 225 in response to successive shift signals applied thereto;

FIG. 3A illustrates the configuration of a second syndrome generator 235 that is also included in the decoder of FIG. 1; and FIG. 3B lists the binary patterns generated by the unit 235 in response to successive shifts thereof.

The system shown in FIG. 1 includes a source 100 for supplying successive encoded information sequences each of which is a member of a cyclic or pseudo-cyclic code. Each of the sequences supplied by the source 100 includes $n$ digits the first $k$ of which are information digits and the next $n$-$k$ of which are check digits that are formed with respect to the information digits in accordance with a predetermined parity relationship. Codes of this general type are well-known in the art, being described, for example, in "Error-Correcting Codes" by W. W. Peterson, The M.I.T. Press and John Wiley and Sons, 1961.

If the minimum distance between any two sequences of such a code is $2e+1$, where $e$ is any positive integer, the code is sufficiently redundant that it is possible to correct all occurrences of $\leq e$ errors in an n-digit sequence thereof. However, in accordance with the principles of the present invention, the full error-correcting capabilities of such a code are not taken advantage of by the novel decoder shown in FIG. 1. Instead, the decoder is arranged to correct only those single- and double-error occurrences which include at least one erroneous information digit. By limiting the error-correcting capabilities in this way it has been found that the decoding function can be performed in an efficient manner by equipment that is relatively simple. For many information-processing applications of practical importance this limited error-correction capability is adequate to significantly improve the over-all reliability of the system.

The source 100 is assumed to be capable of generating $2^k$ different $k$-digit binary information sequences. Herein, for illustrative purposes, $k$ will be assumed to be 21. Hence, the source 100 will be considered to be capable of generating $2^{21}$ or approximately 2,000,000 different 21-digit information sequences. As noted above, each of these information sequences is then encoded in accordance with known principles in such a manner that $n$-$k$ check digits are appended thereto. Herein $n$-$k$ will be assumed to be 10. Thus, each illustrative $n$-digit sequence will include a total of 31 digits.

Sequences supplied by the source 100 of FIG. 1 are coupled via a noisy or error-prone communication channel 150 to a specific illustrative decoder 200 which is constructed in accordance with the principles of the present invention. It is to be understood that the channel 150 may be of a type that interconnects remotely-spaced encoding and decoding units such as in a long distance communication system. On the other hand, the channel 150 may equally well be considered to be of the type which interconnects encoding and decoding units associated with information-processing equipment positioned at a single location. In either case, the decoder is capable of abstracting the original $k$-digit information content from the transmitted redundant sequence even if the sequence is mutilated to a limited extent during propagation along the channel. Specifically, the decoder 200 is capable of processing a received sequence to correct all those single- and double-error occurrences therein which include at least one erroneous information digit.

Before proceeding to a detailed description of the decoder 200 shown in FIG. 1, it will be helpful to a better understanding thereof to briefly discuss the nature of the decoding process. Additionally, in view of the fact that certain portions of the decoder are similar in construction and operation to the encoding equipment included in the source 100, reference to the encoding process is also considered to be relevant.

The encoding equipment in the source 100 includes a feedback shift register of the general type shown in the aforecited Peterson text. Basically, the action of such an encoder corresponds to dividing a polynomial representative of an information sequence by a polynomial $P(X)$ whose coefficients are determined by the feedback connections of the encoding shift register. In general, a $k$-digit information sequence is represented by the polynomial $$D(X)=d_0+d_1X+\ldots+d_{k-1}X^{k-1} \quad (1)$$

In this representation of the information digits corresponding to the high-order coefficients are delivered first to the channel 150. Each of the coefficients $d_0, d_1 \ldots d_{k-1}$ in representation (1) is a "0" or a "1," depending respectively on the binary value of the correspondingly-positioned information digit. After $k$ information digits have been shifted into such an encoder and simultaneously shifted to the channel, the feedback connection of the encoder is disabled and the contents of the shift register are delivered to the channel. The contents thereof comprise the remainder R(X) of $$X^{n-k}D(X)/P(X) \quad [\text{i.e., } X^{n-k}D(X) \text{ MOD } P(X)]$$

Thus the redundant sequence $V_T(X)$ delivered to the channel 150 is represented by $$V_T(X)=X^{n-k}D(X)+R(X) \quad (3)$$

The sequence $V_R(X)$ actually received by the decoder 200 of FIG. 1 is $$V_R(X)=V_T(X)\oplus N(X)=X^{n-k}D_R(X)+R_R(X) \quad (4)$$

where $N(X)$ is the error sequence caused by noise on the channel 150 and the symbol $\oplus$ indicates modulo 2 addition of the transmitted and error sequences in a digit-by-digit manner (e.g. $1101\oplus1011=0110$). Separating N$(X)$ into two parts, $D_N(X)$ and $R_N(X)$ corresponding to errors in the information and check portions of $V_T(X)$, respectively, $V_R(X)$ may then be represented as follows:

$$V_R(X)=X^{n-k}[D(X)\oplus D_N(X)]+R(X)\oplus R_N(X) \quad (5)$$

The first $k$ digits of $V_R(X)$ are re-encoded in the decoder 200 to obtain a recalculated set $R_L(X)$ comprising $n$-$k$ check digits. These recalculated check digits are then added modulo 2 to the received set of check digits to provide an error syndrome $S(X)$ which is representative of the error status of the received redundant sequence. In other terms, $$S(X)=R_R(X)\oplus R_L(X) \quad (6)$$

which may be expressed as $$S(X)=X^{n-k}[D(X)\oplus D_N(X)] \text{ MOD } P(X)\oplus R(X)\oplus R_N(X)$$

And, since $$[X^{n-k}D(X)] \text{ MOD } P(X)=R(X)$$
$$S(X)=X^{n-k}D_N(X) \text{ MOD } P(X)\oplus R_N(X) \quad (8)$$

The number of "1" signals in the $n$-$k$ digit error syndrome word is then determined. If this number or "weight" is 2 or less, the received information digits are accepted as correct. This is so because the only $r$ error patterns (where $r$ equals 1 or 2) which produce an error syndrome of weight $r$ consist of $r$ errors in the check digit portion of the received sequence. However, if the weight of the error syndrome is greater than 2, an attempt is made to locate the error or errors in the information portion of the sequence. This attempt involves sequentially generating the error location patterns corresponding to all those single- and double-error occurrences which include at least one erroneous information digit. The specific manner in which this is done will be illustrated in detail hereinbelow in connection with a particular decoding example.

However, first let us consider the components included in the illustrative decoder shown in FIG. 1. Clock and control circuitry 205 is provided therein for performing conventional timing, enabling, resetting, counting, shifting and control functions. To initiate a decoding cycle of operation, the circuitry 205 controls gate units 207, 209 and 211 in the following manner: first, the gate units 209 and 211 are disabled and the gate unit 207 is enabled. As a result, the first *k* digits (the information portion) of a received sequence are applied to a buffer register 210 and to an encoder 212 whose arrangement and operation are identical to that of the encoding equipment included in the source 100. Subsequent to the receipt of the information digits by the encoder 212, the encoder contains therein a recalculated *n-k* digit check sequence. If no errors occurred during transmission, this recalculated check sequence should be identical to the check portion of the received sequence.

The actual comparison between the two check sequences is carried out under control of the circuitry 205. Specifically, after receipt by the decoder 200 of the *k* information digits of a received sequence, the gate unit 207 is disabled and the units 209 and 211 are enabled. The recalculated check digits are then applied in sequence via the unit 211 to an EXCLUSIVE-OR circuit 213. In synchronism therewith the *n-k* check digits of a received redundant word are sequentially applied via the enabled unit 209 to the EXCLUSIVE-OR circuit 213. The circuit 213 compares the binary representations in corresponding digit positions of the two noted check sequences and provides a "1" output signal each time that corresponding digits differ in value.

The output of the EXCLUSIVE-OR circuit 213 is the error syndrome word or pattern referred to above. This *n-k* digit binary pattern is applied to an error syndrome register 215 wherein it is stored for subsequent comparison operations. Additionally, the output of the circuit 213 is applied to a unit 217 which counts the number of "1" signals therein. In turn, the unit 217 supplies signals indicative of this count to the circuitry 205.

If the count indicated by the unit 217 is 2 or less (indicative of the information digits being error-free) the circuitry 205 responds thereto by initiating a readout from the buffer register 210 to a utilization circuit 220 via an output EXCLUSIVE-OR circuit 219. During this readout operation no correction signals are applied to the circuit 219 by way of lead 222, whereby the received information sequence is delivered to the utilization circuit 220 in unmodified form.

If the count indicated by the unit 217 is greater than 2, an attempt is made by the decoder 200 to locate and correct the erroneous portion of the received sequence. This attempt involves three main steps. The first step comprises the sequential generation by a syndrome generator unit 225 of all those *n-k* digit binary words which would appear at the output of the EXCLUSIVE-OR circuit 213 in response to only one received digit (an information digit) being in error. More specifically, the unit 225 sequentially generates *k* words each of which is uniquely representative of an error occurrence in a different digit position of the *k*-digit information portion of a received sequence. In fact, the words generated by the unit 225 correspond respectively to a single error occurrence in the first through *k*th information digits received by the decoder 200. Thus, for example, if the fourth word generated by the unit 225 is found to be identical to the error syndrome pattern stored in the register 215, the fourth received information digit is thereby indicated to be in error. Correction thereof is carried out simply by applying a "1" correction signal to the lead 222 in synchronism with the application to the circuit 219 from the buffer register 210 of the fourth information digit. An erroneous "0" information signal is thereby converted to a "1" signal and, conversely, an erroneous "1" information signal is in that manner changed to a "0" representation.

The process described above as being involved in the first decoding step continues until the syndrome generator 225 has produced *k* patterns, or until one of the generated patterns is detected by a comparator 227 to be identical to the contents of the error syndrome register 215, whichever occurs first. This completes the search for single errors in the information sequence. If none of the *k* generated words matches that stored in the register 215, the step described below and designated No. 2 is carried out.

Before describing step No. 2, however, let us consider the arrangement of the syndrome generator 225 which is shown in detail in FIG. 2A. The generator 225 includes *k* conventional shift register stages. Herein *k* is assumed for illustrative purposes to equal 10. Therefore, the generator 225 includes 10 stages 300 through 309, each of which is designated SRS. The output of each shift register stage is applied to its adjacent stage either directly or, in the case of the stages 301, 306, and 307, is applied thereto via an associated EXCLUSIVE-OR circuit. Also applied to each stage are SHIFT and RESET signals obtained from the clock and control circuitry 205. In addition, the left-most stage 300 of the register has another input lead 315 extending thereto. As described below, an initial "1" signal is applied to this lead 315 from the circuitry 205.

Furthermore, the output of the shift register stage 300 shown in FIG. 2A is not only applied directly to one input of the right-most stage 309, but is also applied to the EXCLUSIVE-OR circuits 316, 317 and 318. In addition, the leads 320 through 329 connected to the stages 300 through 309 convey signals representative of the respective contents thereof to the comparator 227 shown in FIG. 1.

To carry out the first decoding step described above, an initial "1" signal is applied to the shift register stage 300 of FIG. 2A. Then a single shift signal is simultaneously applied to all the stages 300 through 309. The resulting 10-digit binary representation stored in the stages 300 through 309 of the syndrome generator 225 after the application thereto of this first shift signal is indicated in the first row of FIG. 2B. Thus, in the first comparison operation of the first decoding step, the binary number 1000011001 is compared by the unit 227 with the particular error syndrome pattern stored in the register 215. If a match therebetween does not occur, the stages 300 through 309 of FIG. 2A are shifted once again, thereby producing the syndrome listed in the second row of FIG. 2B. Then another comparison operation takes place, and so forth, until, as noted above, a match occurs or all 21 syndromes have been generated without detecting a match condition. It is noted that each shift of the syndrome generator 225 is registered by an associated counter unit 230 which is controlled by the circuitry 205.

The failure during the first decording step to achieve a match between one of the syndromes listed in FIG. 2B and the binary pattern stored in the error syndrome register 215 initiates the decoder 200 the commencement of the second aforementioned main decoding step. In preparation for the second step, the syndrome generator 225 is reset by the circuitry 205 to the representation shown in the first row of FIG. 2B and the associated counter 230 is reset to a count of one. Then an initial "1" signal is applied by the circuitry 205 to a second syndrome generator 235, and a counter 240 associated with the generator 235 is set to an initial count of one.

The generator 235 of FIG. 1 is depicted in detail in FIG. 3A. The initial "1" signal referred to above is applied to the left-most stage 400 to set the contents of the generator 235 to the binary representation listed in the first row of FIG. 3B.

Subsequent to the preparatory operations described above, the second decoding step is carried out. This step involves comparing in the comparator unit 227 the modulo 2 sum of the two *n-k* digit representations stored in the syndrome generators 225 and 235 with the *n-k* digit error syndrome stored in the register 215. If the compared patterns are not identical, the generator 225 is shifted once and a second comparison operation takes place. Successive comparison operations of this same type continue until the generator 225 has been shifted *k* times or until a match is detected, whichever occurs first. If no match occurs the generator 225 and the counter 230 are again reset, as described above. Then the generator 235 is shifted once more, whereby the binary representation listed in the second row of FIG. 3B is stored in the generator 235. Subsequently, the generator 225 is shifted *k* more times, with a comparison operation of the type specified above being carried out after each shift thereof.

The above-described process is repeated for *n-k* shifts of the syndrome generator 235 or until an error (a match condition) is located. If at any time the comparator 227 detects that the modulo 2 sum of the two *n-k* digit representations stored in the generators 225 and 235 is identical to the pattern stored in the error syndrome register 215, the decoding process stops and the position of the erroneous information digit to be corrected is indicated by the counter unit 230. A total count of *n-k* or less by the unit 240 is disregarded because we are not concerned herein with the correction of errors in the check digit portion of a received sequence.

The second decoding step specified above is simply a search for those double-error patterns which include one erroneous information digit and one erroneous check digit. Since error syndromes having weights $\leq 2$ were in effect initially discarded by the decorder 200 shown in FIG. 1, no search for double errors in the check digit portion of a received sequence is necessary.

The third main step characteristic of the decoder 200 shown in FIG. 1 comprises a search for double errors in the information digits of a received sequence. This last step is initiated if neither one of the previously-described first and second steps has succeeded in locating the erroneous portion of the sequence. The third step is a continuation of the second one and involves shifting the syndrome generator 235 one additional time (the *n-k*+1st time). The generator 225 is then successively shifted to generate in order the patterns listed in FIG. 2B. After each shift of the generator 225 the contents of the generators 225 and 235 are summed modulo 2 and compared to the representation stored in the error syndrome register 215. If a match condition is detected by the comparator 227, the search for errors stops. If a match does not occur during the shifting of the generator 225, the unit 235 is subsequently shifted once more and then the unit 225 is cycled again. This mode of operation is successively repeated until the unit 235 has been shifted *n*-1 times or until the errors have been located.

If a match occurs during the aforedescribed operations, the actual locations of the erroneous information digits are designated by the counter units 230 and 240. In particular, if at the time a match occurs the units 230 and 240 indicate counts of *a* and *b*, respectively, the two erroneous information digits are specified to be in digit positions *n*+1-*a* and *b* of the received sequence.

With respect to the third decoding step, it is noted that after *n-k+s* shifts of the syndrome generator 235, the generator 225 need be shifted at most *k-s* times, since further operation thereof would simply duplicate previouly-generated modulo 2 sums of the contents of these two units.

As described above, whenever a match condition occurs during the third decoding step, the counter units 230 and 240 are representative of the positions of erroneous information digits. The counts of the units 230 and 240 are applied to an error address register 250 which, under the control of signals from the circuitry 205, supplies two "1" correction signals to the EXCLUSIVE-OR circuit 219. These correction signals are supplied to the circuit 219 in synchronism with the application thereto from the buffer register 210 of the information digits in digit positions *n*+1-*a* and *b*. In this way the two erroneous information digits are inverted and thereby corrected before being delivered to the utilization circuit 220.

If no match condition is detected during the third decoding step, an error pattern exists in the received sequence but the pattern is uncorrectable by the decoder 200 of FIG. 1. In this eventuality the contents of the buffer register 210 may be delivered to the utilization circuit 220 in unmodified form accompanied by an error signal from the error address register 250. This error signal, which is applied to the circuit 220 via lead 255 emanating from the register 250, indicates to the circuit 220 the presence of a detected but uncorrected error occurrence in the received sequence.

In addition to tagging uncorrectable information sequences delivered to the utilization circuit 220, the decoder 200 may, if desired, be adapted to respond to an error signal on the lead 255 to trigger a request to the source 100 for a retransmission of the erroneous and uncorrected information. The arrangement of a typical such retransmission system is described in a copending application of L. P. McRae, R. N. Watts and W. J. Wolf, Jr., Ser. No. 356,528, filed Apr. 1, 1964.

A specific example will serve to illustrate the particular manner in which the decoder 200 described above functions to detect and correct errors. Let $$n=31,\ k=21 \text{ and } P(X)=X^{10}+X^7+X^6+X+1 \quad (9)$$

Assume that the following 21 digit information sequence $$100110000001000100001 \quad (10)$$

is to be transmitted (right-most digit first) from the source 100 via the noisy channel 150 to the utilization circuit 220. The polynomial $D(X)$ representative of these information digits is $$D(X)=X^{20}+X^{15}+X^{11}+X^4+X^3+1 \quad (11)$$

and the remainder $R(X)$ is represented as follows:

$$R(X)=[X^{10}D(X)] \text{ MOD } P(X)=X^9+X^7+X^2+X+1 \quad (12)$$

Therefore, the transmitted sequence $V_T(X)$ is $$V_T(X)=X^{30}+X^{25}+X^{21}+X^{14}+X^{13}+X^{10}+X^9+X^7+X^2+X+1 \quad (13)$$

or $$1110000101100110000001000100001 \quad (14)$$

wherein the left-hand 10 digits comprise the check digit portion of the transmitted sequence.

Assume that the information digits in positions 2 and 17 of $V_T(X)$ are received in error by the decoder 200 of FIG. 1. In other words, $$N(X)=X^{29}+X^{14} \quad (15)$$

Therefore, the redundant sequence actually received by the decoder is $$V_R(X)=X^{30}+X^{29}+X^{25}+X^{21}+X^{13}+X^{10}+X^9+X^7+X^2+X+1 \quad (16)$$

or $$11100001011001\underline{0}0000001000100\underline{1}1 \quad (17)$$

wherein the incorrectly-received second and seventeenth information digits in (17) have been underlined for ease of identification. From the 21-digit information portion of the received sequence $V_R(X)$ the encoder 211 obtains $$R_L(X)=X^7+X^5+X+1 \quad (18)$$

Thus, $$S(X)=R_L(X)\oplus R_R(X)=X^9+X^5+X^2 \quad (19)$$

and the pattern that is applied from the EXCLUSIVE-OR circuit 213 to the error syndrome register 215 is $$0010010001 \qquad (20)$$

During the first decoding step described in detail above, the word (20) is successively compared with the 21 syndromes listed in FIG. 2B. Inspection of that list shows that it does not contain a pattern identical to (20). Therefore, no match signal is applied from the comparator 227 to the clock and control circuitry 205 during the first step.

Next in the decoding process the syndrome generator 235 is set to the representation indicated in the first row of FIG. 3B and the generator 225 is again sequenced through the patterns of FIG. 2B. For each of these FIG. 2B patterns the comparator 227 forms the modulo 2 sum of the registrations stored in the generators 225 and 235 and compares that sum with (20).

The mode of operation described above as comprising the second decoding step is then continued. At no time during that step does a match signal appear at the output of the comparator 227. This can easily be verified by actually adding (modulo 2) each of the patterns in the first 10 rows of FIG. 3B to every one of the 10-digit listings of FIG. 2B.

Subsequently, the third decoding step detailed above commences. After the syndrome generator 235 has been shifted 15 times and the generator 225 shifted twice (after last being reset) the respective patterns stored in the generators 235 and 225 are as follows:

$$1010111010 \qquad (21)$$

and $$1000101011 \qquad (22)$$

Modulo 2 addition of these two binary words gives $$0010010001 \qquad (23)$$

which is seen to be identical to the error syndrome (20) stored in the register 215. Accordingly, at this point the comparator 227 supplies a match signal to the circuitry 205 and the search for errors by the decoder 200 stops. At the time the match occurs the counter units 230 and 240 register counts $b$ and $a$ (2 and 15, respectively). In turn, as described above, the error address register 250 translates these counts to $b$ and $n+1-a$, respectively, which for the specific case considered herein are 2 and 17. Furthermore, the register 250 generates "1" correction signals in those time slots in which the second and seventeenth information digits are being applied from the buffer register 210 to the EXCLUSIVE-OR circuit 219 under control of the circuitry 205. In this way the information portion of the erroneously-received sequence (17) is converted to $$100110000001000100001 \qquad (24)$$

which is identical to the originally-transmitted 21-digit information sequence represented in (10). Accordingly, despite the mutilation of the transmitted sequence during propagation along the channel 150, the 21-digit information sequence delivered to the utilization circuit 220 is a correct version of the information which originated at the source 100.

In one illustrative mode of operation characteristic of the decoder 200 described herein, the error address register 250 derives correction signals from a particular received sequence and is ready to apply these signals to the lead 222 as soon as the $k$th digit of the previous sequence has been delivered to the utliization circuit 220. These correction signals are supplied by the register 250 in synchronism with the outpulsing from the buffer register 210 of the information digits temporarily stored therein. Advantageously, digits are supplied by the register 210 one digit at a time in their original order at a uniform rate of $k/nR_L$ digits per second, where $R_L$ is the line rate in digits per second of the channel 150.

From the description herein, it is apparent that decoding may require a total of $\frac{1}{2}k(k+1)+k(n-k)$ operations. If these operations can be accomplished during the time that $n$ digits are received by the decoder 200, no queue of sequences requiring decoding can build up. For this to be so, the minimum computation rate $R_C$ of the decoder 200 must be $$R_C=kR_L(2n=k+1)/2n \qquad (25)$$

operations per second. For example, if the 31, 21 code assumed herein is embodied in the decoding system, $$R_C=441/31\ R_L \qquad (26)$$

operations per second.

The number of operations per second that must be performed by the decoder 200 may be reduced in various different ways. For example, $k(n-k)$ operations can be eliminated if the comparator 227 is arranged to deliver an output whenever the modulo 2 sum of the contents of the generators 225 and 235 is either identical to the contents of the register 215 or different therefrom in exactly one position during the search for single errors. In this case (25) reduces to $$R_C'=R_L\frac{k}{2n}(k+1) \qquad (27)$$

operations per second.

Additional operating steps can be eliminated by adopting the following strategy. Each time that the syndrome generator 235 is shifted, weigh the modulo 2 sum of the patterns stored in the generator 235 and the error syndrome register 215. If the weight of this sum is less than 4, shift the generator 235 again before shifting the generator 225. This simplification stems from the recognition that since no single error syndrome can have a weight of 3 or less, it is futile in such cases to search for single error syndromes which satisfy the condition that the contents of the generator 225 be equal to the modulo 2 sum of the respective contents of the generator 235 and the register 215.

Thus, an information-processing system made in accordance with the principles of this invention is capable of automatically correcting all those single- and double-error patterns that include at least one erroneous information digit. For certain other types of errors, the decoder is able to detect but not correct the occurrence thereof. This over-all error control capability is achieved in a remarkably simple and efficient manner.

Specific implementations of the source 100, the circuitry 205, the registers 210, 215 and 250, the encoder 212, the gates 207, 209 and 211, the EXCLUSIVE-OR circuits 213 and 219, the counter units 217, 230 and 240 and the comparator 227, are considered in view of the particular end requirements therefor set forth above, to be clearly within the skill of the art and are accordingly not set forth in detail herein.

It is noted that my copending application Ser. No. 439,649, filed concurrently herewith, is directed to a modification of the system described herein.

Furthermore, it is to be understood that the above-described decoding arrangements are only illustrative of the application of the principles of the present invention. In accordance with these principles, numerous other arrangements may be devised by those skilled in the art without departing from the spirit and scope of the invention.

What is claimed is:

1. Apparatus for decoding a redundant sequence which includes information and check digit portions, comprising first and second units for generating binary syndrome patterns, means for combining said patterns to produce error location patterns representative of all single- and double-error occurrences which include at least one erroneous information digit, means responsive to said redundant sequence for forming a binary error syndrome pattern representative of the error status of said received sequence and for indicating whether the information portion thereof contains errors, and means responsive to an indication that said information portion contains errors for comparing said error syndrome pattern with successive ones of said location patterns and for providing a signal representative of the relative correspondence of said patterns.

2. A combination as in claim 1 further including means responsive to a signal indicating an identity between said error syndrome pattern and one of said error location patterns for locating the position or positions of the erroneous information digit or digits.

3. A combination as in claim 2 wherein each of said first and second generating units comprises a feedback-type shift register.

4. A combination as in claim 3 comprising means for applying shift signals to said units, and first and second counter units respectively associated with said first and second generating units for counting the number of shift signals applied thereto.

5. A combination as in claim 4 still further including a buffer register for storing the information digit portion of said sequence, an EXCLUSIVE-OR circuit connected to said buffer register, means for serially reading out from said buffer register the information digits stored therein, an error address register controlled by said reading out means and responsive to the counts registered in said first and second counter units for applying control signals to said EXCLUSIVE-OR circuit in synchronism with the respective application thereto of said information digits.

6. In combination in a system for decoding a received redundant sequence which has been encoded in accordance with an error control code, said sequence including an information digit portion, said system comprising an error syndrome buffer, first means responsive to said received sequence for generating a binary error syndrome representative of the error status of said sequence and for applying said representation to said buffer, second means responsive to said error syndrome representation for counting the number of "1" signals therein, third means for supplying sequencing signals, syndrome means responsive to said second means indicating a count greater than two and responsive to signals from said third means for sequentially generating error location binary indications corresponding to all single- and double-error patterns which include at least one erroneous information digit, fourth means for comparing the indications sequentially generated by said syndrome means with the representation contained in said buffer and for providing a first type of signal in the event of an identity between said buffer representation and one of said indications and for providing a second type of signal in the event of a lack of identity therebetween, fifth means responsive to said first type of signal for locating the positions of erroneous information digits, and sixth means responsive to said second type of signal for indicating that said sequence contains detected but uncorrected errors.

References Cited

UNITED STATES PATENTS

| | | | |
|---|---|---|---|
| 3,162,837 | 12/1964 | Meggitt | 340—146.1 |
| 3,291,972 | 12/1966 | Helm | 340—146.1 X |

OTHER REFERENCES

J. H. Green and R. L. San Soucie: An Error-Correcting Encoder and Decoder of High Efficiency, Proceedings of the IRE, Oct. 1958.

MALCOLM A. MORRISON, *Primary Examiner.*

C. E. ATKINSON, *Assistant Examiner.*